(12) United States Patent
Linow et al.

(10) Patent No.: US 10,819,001 B2
(45) Date of Patent: Oct. 27, 2020

(54) MOTOR VEHICLE HAVING A GLASS ROOF AND HAVING AN ANTENNA ARRANGEMENT SEATED ON THIS GLASS ROOF

(71) Applicant: FORD GLOBAL TECHNOLOGIES, LLC, Dearborn, MI (US)

(72) Inventors: Angela Linow, Cologne (DE); Vicky Patricia Delgado, Cologne (DE); Daniel Hahnenberg, Zülpich (DE); Enrico Krause, Cologne (DE); Victor Garrido, Cologne (DE); Marc Bosbach, Rommerskirchen (DE); Thomas Benderoth, Gummersbach (DE); Werner Jakobs, Bergisch Gladbach (DE)

(73) Assignee: Ford Global Technologies, LLC, Dearborn, MI (US)

(*) Notice: Subject to any disclaimer, the term of this patent is extended or adjusted under 35 U.S.C. 154(b) by 175 days.

(21) Appl. No.: 16/193,139

(22) Filed: Nov. 16, 2018

(65) Prior Publication Data
US 2019/0157743 A1    May 23, 2019

(30) Foreign Application Priority Data

Nov. 21, 2017  (DE) .......................... 10 2017 220 732

(51) Int. Cl.
*H01Q 1/44* (2006.01)
*H01Q 15/14* (2006.01)
(Continued)

(52) U.S. Cl.
CPC ............. *H01Q 1/1271* (2013.01); *H01Q 1/12* (2013.01); *H01Q 1/1214* (2013.01);
(Continued)

(58) Field of Classification Search
CPC ...... H01Q 1/1271; H01Q 9/32; H01Q 1/1214; H01Q 1/42; H01Q 1/48; H01Q 1/44; H01Q 15/14; H01Q 1/32; H01Q 1/12
(Continued)

(56) References Cited

U.S. PATENT DOCUMENTS 4,306,241 A * 12/1981 Sono ....................... H01Q 1/084
                                                   343/713
5,128,685 A *  7/1992 Shinnai ................ H01Q 1/1271
                                                   343/713
(Continued)

FOREIGN PATENT DOCUMENTS

DE          69932930 T2    2/2007
DE      102007007939 A1   12/2007
(Continued)

OTHER PUBLICATIONS

English Machine Translation of DE102006045514A1 dated Feb. 21, 2008.
(Continued)

*Primary Examiner* — Hai V Tran
(74) *Attorney, Agent, or Firm* — David Coppiellie; King & Schickli, PLLC

(57) ABSTRACT

The motor vehicle has a glass roof, an antenna arrangement seated on this glass roof, and a metallic frame. An opening of the glass roof is located below the antenna arrangement and is covered thereby. The frame is located below the glass roof and forms a dome, which extends into the opening of the glass roof and to which the antenna arrangement is mechanically connected. A reflection surface associated with the antenna arrangement is attached on the lower side of the glass roof. The reflection surface has a grid structure made of intersecting lines extending transversely to the z direction. The lines are provided with a metallization which has a width of 0.5 to 2 mm. The intersecting lines delimit free (Continued)

Figure 1:
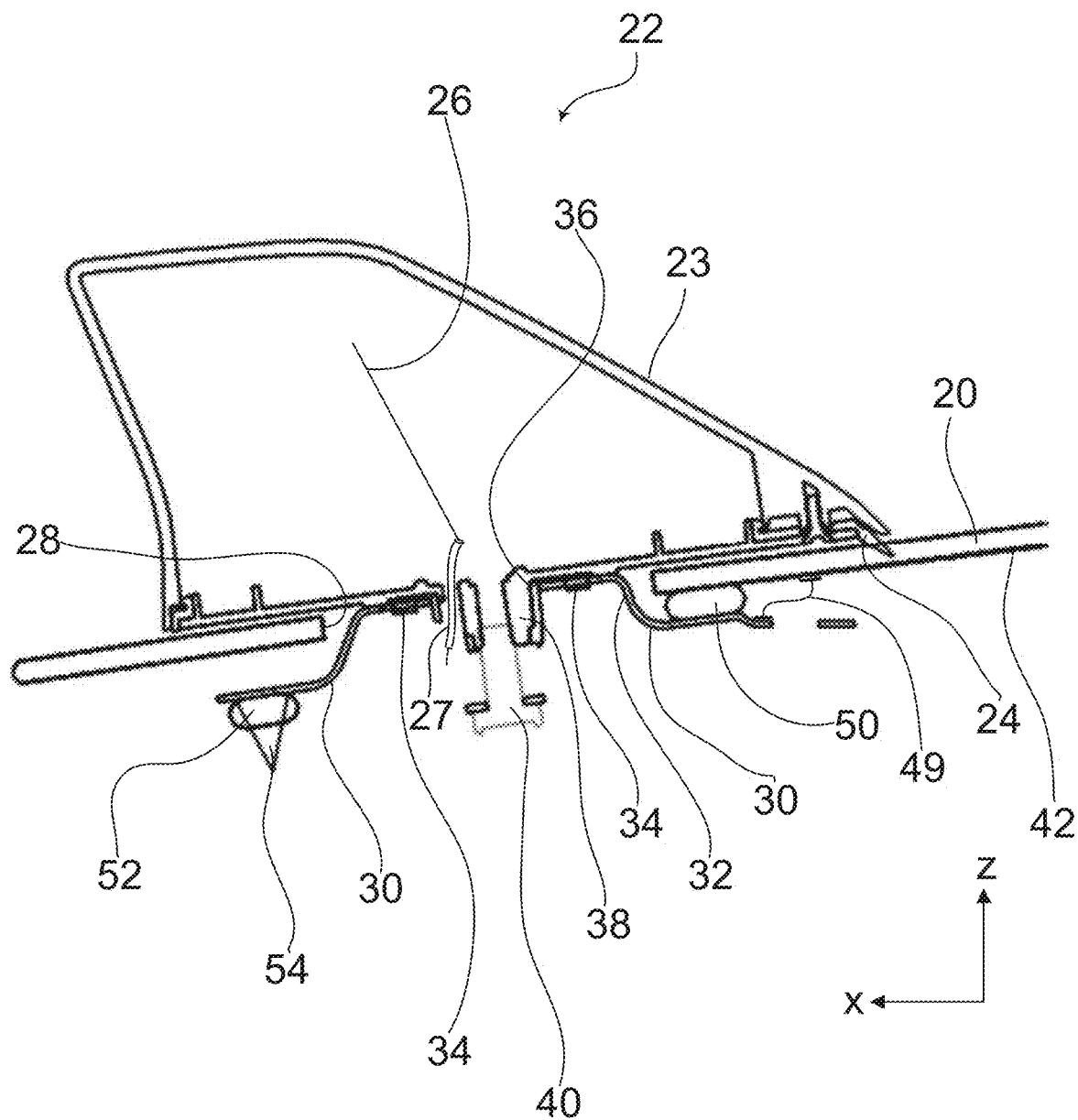

fields, which are not metallized and have a maximum clear dimension of 3 to 15 mm.

18 Claims, 3 Drawing Sheets

(51) Int. Cl.
  *H01Q 1/32* (2006.01)
  *H01Q 1/12* (2006.01)
  *H01Q 9/32* (2006.01)
  *H01Q 1/42* (2006.01)
  *H01Q 1/48* (2006.01)
  B62D 25/06 (2006.01)

(52) U.S. Cl.
  CPC ............ *H01Q 1/3275* (2013.01); *H01Q 1/42* (2013.01); *H01Q 1/44* (2013.01); *H01Q 1/48* (2013.01); *H01Q 9/32* (2013.01); *H01Q 15/14* (2013.01); B62D 25/06 (2013.01)

(58) Field of Classification Search
  USPC ......................................................... 343/713
  See application file for complete search history.

(56) References Cited

U.S. PATENT DOCUMENTS

| | | | |
|---|---|---|---|
| 7,154,444 B2 | 12/2006 | Sievenpiper | |
| 2005/0062658 A1* | 3/2005 | Magg | H01Q 1/1271 343/711 |
| 2008/0180332 A1* | 7/2008 | Noro | H01Q 1/526 343/713 |
| 2011/0032164 A1* | 2/2011 | Villarroel | H01Q 1/3275 343/713 |
| 2013/0140847 A1* | 6/2013 | Altes | B32B 17/10293 296/152 |
| 2013/0141289 A1* | 6/2013 | Vortmeier | H01Q 1/50 343/711 |
| 2015/0270603 A1* | 9/2015 | Lee | H04B 1/18 343/713 |
| 2018/0090828 A1* | 3/2018 | Vendt | H01Q 9/26 |

FOREIGN PATENT DOCUMENTS

| | | |
|---|---|---|
| DE | 102006045514 A1 | 2/2008 |
| DE | 102006056501 A1 | 6/2008 |
| DE | 102008039125 A1 | 3/2010 |
| DE | 102012010694 A1 | 11/2012 |
| DE | 102012010692 A1 | 1/2013 |
| DE | 102012111571 A1 | 6/2014 |
| JP | 2006333092 A | 12/2006 |
| WO | 2010020327 A1 | 2/2010 |

OTHER PUBLICATIONS

English Machine Translation of DE102006056501A1 dated Jun. 5, 2008.
English Machine Translation of DE102007007939A1 dated Dec. 20, 2007.
English Machine Translation of DE102008039125A1 dated Mar. 4, 2010.
English Machine Translation of DE102012010692A1 dated Jan. 31, 2013.
English Machine Translation of DE102012010694A1 dated Nov. 8, 2012.
English Machine Translation of DE102012111571A1 dated Jun. 5, 2014.
English Machine Translation of DE69932930T2 dated Feb. 8, 2007.
English Machine Translation of JP2006333092A dated Dec. 7, 2006.
English Machine Translation of WO2010020327A1 dated Feb. 25, 2010.

* cited by examiner

MOTOR VEHICLE HAVING A GLASS ROOF AND HAVING AN ANTENNA ARRANGEMENT SEATED ON THIS GLASS ROOF

This application claims the benefit of German patent application serial no. 102017220732.9, filed on 11 Nov. 2017, the full disclosure of which is incorporated herein by reference.

TECHNICAL FIELD

This document relates to a motor vehicle having a glass roof and having an antenna arrangement seated on this glass roof. In this case, the glass roof has an opening which is located below the antenna arrangement and is covered thereby. A metallic frame is located under the glass roof and supports it.

BACKGROUND

In the future, more and more radio connections will be established and will be required between a motor vehicle and fixed stations, for example, the Internet, and other motor vehicles. These radio connections have to be able to be implemented over a large frequency range. The frequency range is typically between 700 and 2700 MHz. In addition, there is the reception of broadcast signals at least in the VHF range, which generally extends from 30 to 300 MHz, possibly also at lower frequencies, for example, medium wave and long wave.

This is generally not to be implemented using a single receiving antenna. The invention relates in particular to the above-mentioned frequency range of 700 and 2700 MHz, which is used for mobile wireless (mobile telephones) and therefore, for example, for the communication from motor vehicle to motor vehicle. A suitable antenna arrangement for this purpose is to be specified. It can then be equipped with an auxiliary function for other frequency ranges, i.e., for example, for receiving VHF using an additional antenna rod.

An antenna arrangement is understood hereafter as a component which has a closed housing in the shape of a fin, for example, but other shapes are possible. This housing is generally located on the roof of a motor vehicle and is therefore visible from the outside when looking at the motor vehicle. The antenna arrangement is electrically connected via a connecting cable, which is led through the roof of the motor vehicle. A receiving antenna for the above-mentioned frequency range and possibly additional electronic assemblies such as amplifiers and adapter elements are housed in the housing. A GPS receiver is frequently also arranged in the housing.

The receiving antenna requires a metallic conductive reflection surface. This is at ground potential and is not provided in the case of a glass roof. The metallic frame is excessively far below the glass roof, on the one hand, and is not provided with sufficient surface area, on the other hand. The need therefore exists of specifying and designing a reflection surface such that it supplies a sufficient gain in dB over the frequency range in cooperation with the receiving antenna for the above-mentioned frequency range of 700 to 2700 MHz. The gain is advantageously not to drop more than 2 dB in comparison to a ground plane antenna over the entire frequency range. A ground plane antenna is known from the prior art; it is a $\lambda/4$ wave radiator which is typically vertically oriented. In contrast to a dipole antenna, the ground plane antenna is constructed asymmetrically. The second half of the antenna is formed by a reflection surface; it is also referred to as a counterweight.

An antenna arrangement is known from WO 2010/020327 A1, in which the reflection surface is manufactured from an electrically conductive material, in particular metal, which is connected to the glass roof. The reflection surface can be implemented by a finely-woven grid. In addition, this document also teaches a device for beam forming, which has an electrical floating ground.

A grounding pad, which forms a reflection surface, is known from DE 10 2012 111 571 A1. It is produced as a networked pad made of metal wires, which are fused into a film material and are to be laminated as such into the disk.

A vehicle antenna is known from DE 699 32 930 T2, which has a reflection surface, which is formed from a transparent coating laminated between two glass panes.

A transparent surface electrode on a glass is known from DE 10 2006 045 514 A1. It consists of a grid network of electrically conductive, very fine lines having nodes and meshes.

In the event of an accident of the motor vehicle, the hazard exists that the glass roof will be damaged and shatter. The glass roof has to pass the so-called ECE R43 glass breaking test. This means that if the glass breaks, the resulting glass shards cannot exceed a certain size. If one attaches a reflection surface to the glass roof, the breaking behavior of the glass is thus influenced. It has to be ensured that the reflection surface is embodied in such a manner that the glass roof passes the mentioned test.

SUMMARY

Proceeding therefrom, it is the object hereof to design and specify a reflection surface for the antenna arrangement in such a way that it passes the mentioned glass breaking test, on the one hand, and supplies a sufficiently high gain in the frequency range from 700 to 2700 MHz, on the other hand.

This object is achieved by a motor vehicle having a glass roof. An antenna arrangement is seated on this glass roof. The glass roof has an opening which is located below the antenna arrangement and is covered thereby. The motor vehicle also has a metallic frame which is located below the glass roof and forms a dome. That dome extends into the opening of the glass roof. The antenna arrangement is mechanically connected to the dome. Further, a reflection surface associated with the antenna arrangement is attached on the lower side of the glass roof. That reflection surface has a grid structure made of intersecting lines extending transversely to the z direction, wherein the lines have a metallization which has a width of 0.5 to 2 mm, and the intersecting lines delimit free fields which are not metallized and which have a maximum clear dimension of 3 to 15 mm.

The proposed solution enables a very advantageous compromise between an antenna having good receiving and transmitting properties, i.e. sufficient gain, and an embodiment of the reflection surface on a glass roof, wherein the glass roof passes the glass breaking test in spite of this reflection surface.

The free fields are preferably square. This enables simple production, for example, in the screen-printing method. The side length of the square fields is preferably in the range from 3 to 10 mm, in particular 4 to 7 mm. At these dimensions, the glass breaking test is passed and the antenna gain is in a reasonable range. Preferably, the test is passed and the antenna gain is in a good range when the side length is 5 mm±20%, in particular ±10%. The metallization is preferably 1 to 5 µm thick. This thickness is sufficient for the electrical conductivity, and saves metal, in particular silver. The metallization can be produced by applying a metal paste, in particular silver paste. The silver paste is applied and subsequently fired. The reflection surface is preferably substantially mirror-symmetrical to an x-z plane, which extends through the center of the antenna arrangement. The receiving lobes of the antenna are thus substantially mirror-symmetrical to an x-z plane which goes through the antenna arrangement. The reflection surface is preferably a coherently electrically conductive surface. Therefore, only one contact is necessary. The dimension of the reflection surface in the x direction is preferably 10 to 30%, preferably approximately 20% of the dimension in the y direction. The opening of the glass roof is preferably located outside the reflection surface. This enables a good seal.

BRIEF DESCRIPTION OF THE DRAWING FIGURES

Figure 2:
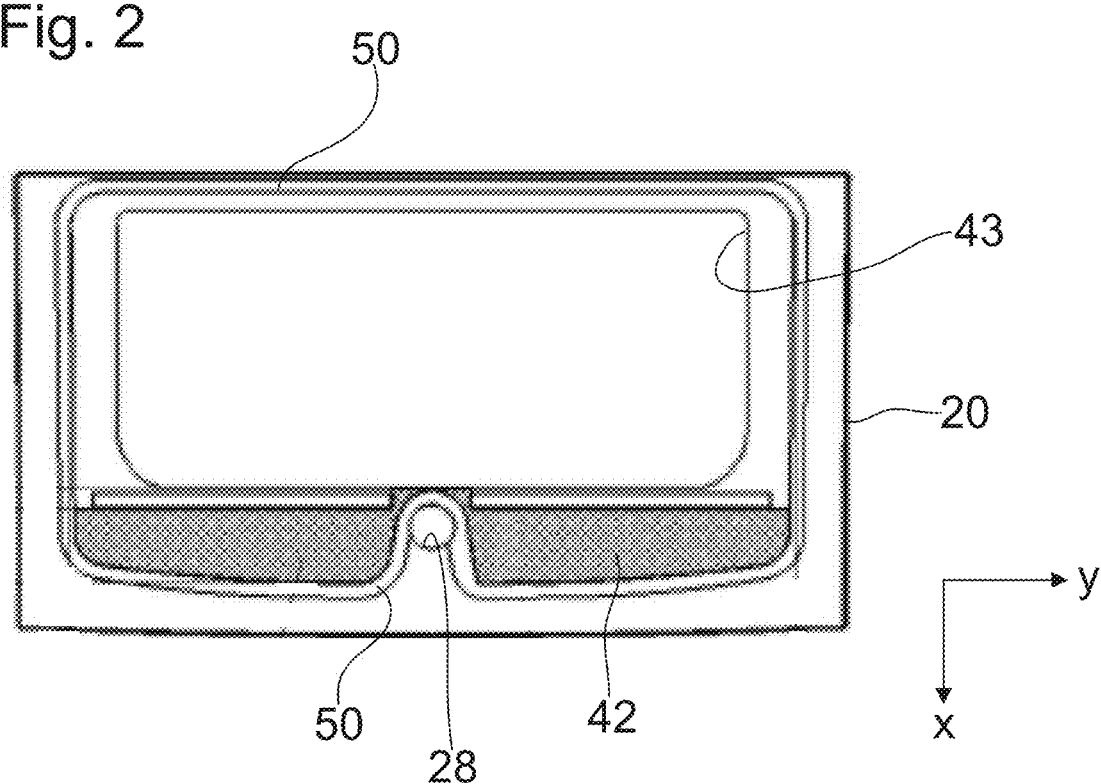
Figure 3:
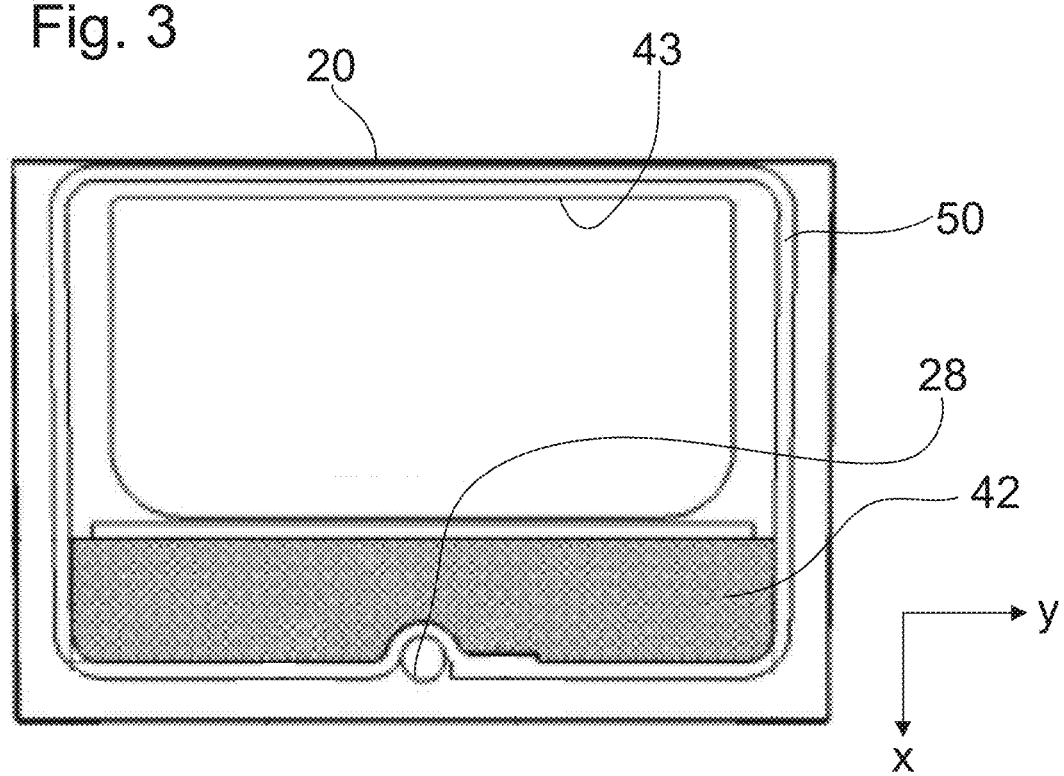
Figure 4:
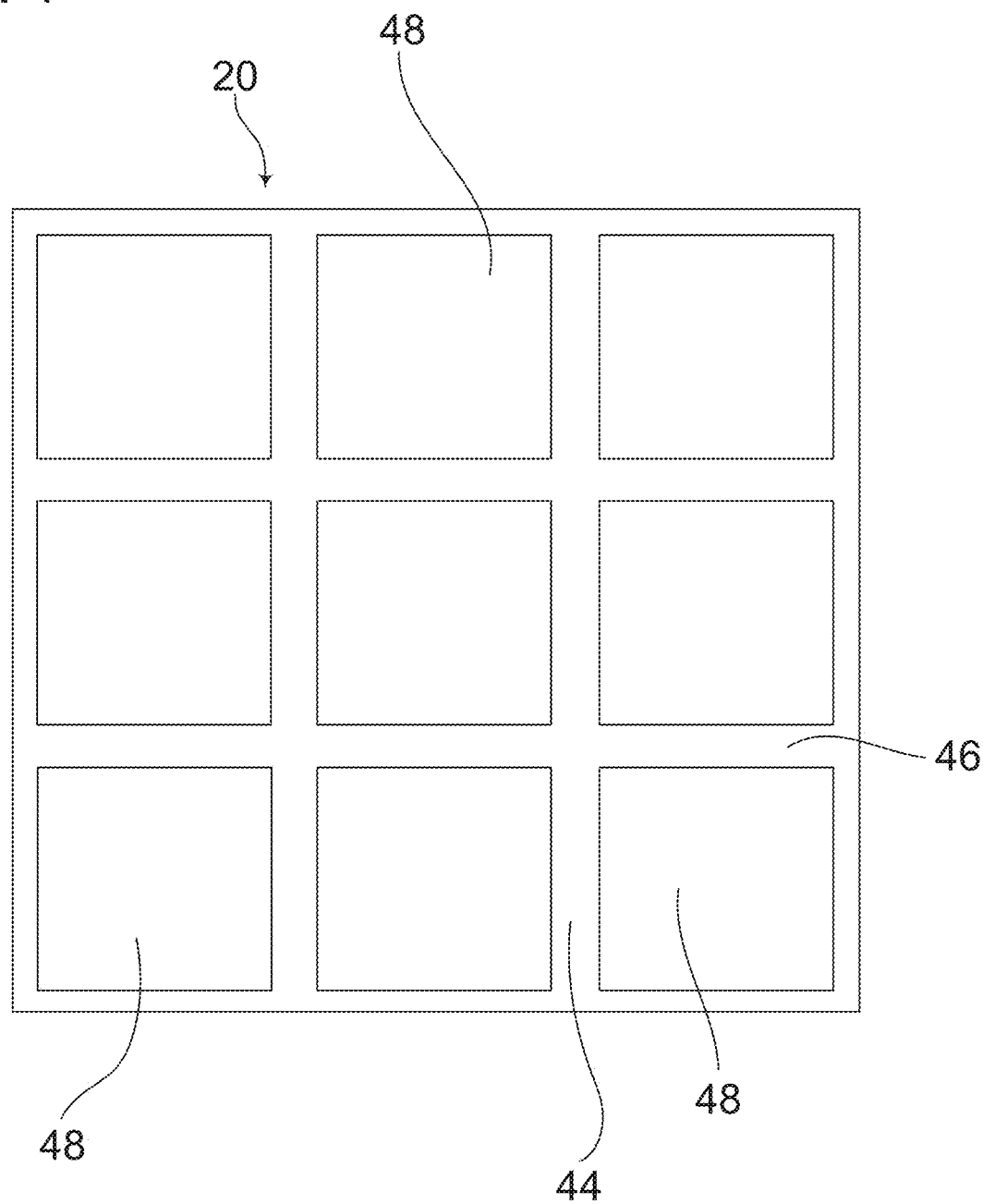

Two exemplary embodiments of the motor vehicle are explained and described in greater detail hereafter; they are not to be understood as restrictive. These exemplary embodiments are described with reference to the drawing. In the figures of the drawing:

FIG. 1 shows a sectional illustration of the antenna arrangement on the glass roof, FIG. 2 shows a bottom view of the glass roof having the reflection surface in a first embodiment, FIG. 3 shows a bottom view like FIG. 2 for a second embodiment, and FIG. 4 shows a detail view of the reflection surface.

DETAILED DESCRIPTION

The motor vehicle will be described on the basis of a right-hand, orthogonal x, y, z coordinate system. The z direction goes vertically upward. The x direction is opposite to the normal travel direction for straight ahead travel of the vehicle (not shown in greater detail here), which is known per se. The x direction and the y direction are in the plane of travel.

A glass roof 20 is shown of the motor vehicle known from the prior art. It consists of single-pane safety glass having a thickness of approximately 3.7 mm. FIG. 2 shows a first exemplary embodiment of the glass roof 20, as is used in FIG. 1. FIGS. 3 and 4 show further exemplary embodiments. The different glass roofs 20 are used for different vehicle types.

FIG. 1 shows an antenna arrangement 22 in a sectional illustration. The plane of section is an x-z plane through the center of the antenna arrangement 22. This has a housing 23 which has the shape of a fin. The housing 23 is terminated on the bottom by a termination plate. An outer seal strip 24 extends on the outer edge thereof. The empty housing 23 is essentially shown in FIG. 1; An antenna rod 26 is shown in a schematic illustration which is used for explanation. In general, it is formed by a printed circuit. Further components which the housing 23 can accommodate are not shown. The antenna rod 26 is connected to a feed line 27.

The housing 23 is seated on the glass roof 20, in which case, the seal strip 24 comes into contact with the glass roof 20 and forms a first seal.

The glass roof 20 has an opening 28, which is located below the housing 23 and is covered by the termination plate. The opening 28 is located inside the seal strip 24. The feed line 27 extends through this opening 28.

A metallic frame 30 is located below the glass roof 20. It forms a dome 32, which protrudes into the opening 28 and has contact there with the housing 23. In this case, a seal is joined in between, which is formed as a first adhesive seam 34 and extends around a fitted opening 36 formed in the dome 32 as a closed ring.

The housing 23 has an attachment 38, which protrudes downward in the negative z direction and which is shaped corresponding to the fitted opening 36 and only fits therein in a single orientation. The housing 23 is clamped in relation to the frame 30 via a clamping screw 40. The antenna arrangement 22 is thus mechanically connected to the metallic frame 30.

A reflection surface 42 associated with the antenna arrangement 22 is applied to the lower side of the glass roof 20. It consists of intersecting lines, namely the first lines 44 and the second lines 46 (see FIG. 5). They have a metallization, produced in the exemplary embodiment by applying silver. The lines 44, 46 have a width of approximately 1 mm. They delimit free fields 48, which are formed square in the exemplary embodiment and also preferably overall. They can also be hexagonal, corresponding to a honeycomb shape. The squares may have a side length of 5 mm. The free fields 48 may have maximum clear dimension in the diagonals thereof of approximately 7 mm. The free fields 48 are all the same shape in the exemplary embodiments shown. It is possible that adjacent free fields 48 have different shapes. The reflection surface 42 is coherently electrically conductive. It is electrically connected via a connection 49 to the frame 30, which is at ground potential.

The metallization is as thin as possible to save silver but is as thick as necessary to obtain sufficient conductivity. It has been shown that a thickness of 0.5 µm is already sufficient. The thickness is preferably in the range of 1 to 5 µm.

In practice, it had been shown that the entire surface area covered with silver is approximately 75,000 mm2. It is preferably in the range from 50,000 to 100,000 mm2.

In a preferred embodiment, the first lines 44 extend at an angle of approximately +45° in relation to the x direction and the second lines 46 extend at an angle of −45° in relation to the x direction.

As the exemplary embodiments according to FIGS. 2 and 3 show, the reflection surface 42 is mirror-symmetrical to an x-z plane, which extends through the center of the antenna arrangement 22. The transparent area of the glass roof 20 is identified with 43 in these figures.

The exemplary embodiments also show that the opening 28 of the glass roof 20 is located outside the reflection surface 42. This enables a seal to be formed between the opening 28 and the reflection surface 42. This seal is achieved by a second adhesive seam 50, as FIGS. 1 to 3 show. The frame 30 is connected to the glass roof 20 thereby. It is circumferential in a ring shape. The transparent area 43 is located inside the ring formed by the second adhesive seam 50.

Finally, the frame 30 is connected via an adhesive bond 52 to a vehicle body part 54 of the vehicle body of the motor vehicle (not shown in greater detail otherwise).

The motor vehicle has a glass roof 20, an antenna arrangement 22 seated on this glass roof 20, and a metallic frame 30. An opening 28 of the glass roof 20 is located below the antenna arrangement 22 and is covered thereby. The frame 30 is located below the glass roof 20 and forms a dome 32, which extends into the opening 28 of the glass roof 20 and is mechanically connected to the antenna arrangement 22. A reflection surface 42 associated with the antenna arrangement 22 is attached to the lower side of the glass roof 20. The reflection surface 42 has a grid structure made of intersecting lines 44, 46 extending transversely to the z direction. The lines 44, 46 are provided with a metallization which has a width of 0.5 to 2 mm. The intersecting lines 44, 46 delimit free fields 48 which are not metallized and have a maximum clear dimension of 3 to 15 mm.

Terms such as substantially, preferably, and the like and also specifications possibly to be understood as imprecise are to be understood in such a way that a deviation by ±5%, preferably ±2%, and in particular ±1% from the normal value is possible. The applicant reserves the right to combine arbitrary features and also subfeatures from the claims and/or arbitrary features and also part features from the description with one another in an arbitrary manner, even outside the features of independent claims.

What is claimed:

1. A motor vehicle, comprising:
   a glass roof;
   an antenna arrangement seated on said glass roof, wherein the glass roof has an opening located below the antenna arrangement and covered thereby;
   a metallic frame located below the glass roof and forming a dome that extends into the opening of the glass roof and to which the antenna arrangement is mechanically connected; and
   a reflection surface associated with the antenna arrangement and attached on a lower side of the glass roof, said reflection surface having a grid structure made of intersecting lines extending transversely to a z direction, wherein the intersecting lines have a metallization which has a width of 0.5 to 2 mm, and the intersecting lines delimit free fields, which are not metallized and have a maximum clear dimension of 3 to 15 mm.

2. The motor vehicle as claimed in claim 1, wherein the free fields are square.

3. The motor vehicle of claim 2, wherein a side length of the free fields is in a range from 4 to 7 mm.

4. The motor vehicle of claim 3, wherein the metallization is at most 2 µm thick.

5. The motor vehicle of claim 2, wherein a side length of the free fields is about 5 mm.

6. The motor vehicle of claim 5, wherein the metallization is at most 2 µm thick.

7. The motor vehicle as claimed in claim 2, wherein a side length of the free fields is in a range from 3 to 10 mm.

8. The motor vehicle as claimed in claim 7, wherein the metallization is at most 5 µm thick.

9. The motor vehicle as claimed in claim 8, wherein the reflection surface is essentially mirror-symmetrical to an x-z plane which extends through a center of the antenna arrangement.

10. The motor vehicle as claimed in claim 9, wherein the reflection surface is coherently electrically conductive.

11. The motor vehicle of claim 10, wherein a first dimension of the reflection surface in an x direction is about 20% of a second dimension in a y direction.

12. The motor vehicle as claimed in claim 10, wherein a first dimension of the reflection surface in an x direction is 10 to 30% of a second dimension in a y direction.

13. The motor vehicle as claimed in claim 12, wherein the opening of the glass roof is located outside the reflection surface.

14. The motor vehicle of claim 13, wherein the reflection surface extends over at least 90% of the second dimension of the glass roof in the y direction.

15. The motor vehicle as claimed in claim 13, wherein the reflection surface extends over at least 80% of the second dimension of the glass roof in the y direction.

16. The motor vehicle as claimed in claim 15, wherein a fitted opening is formed in the dome and a closed first adhesive seam circumferential around the fitted opening is formed between a housing of the antenna arrangement and the metallic frame outside the fitted opening and inside the opening.

17. The motor vehicle as claimed in claim 16, wherein the metallic frame is connected via an adhesive bond to a vehicle body part of the motor vehicle.

18. The motor vehicle as claimed in claim 15, wherein a fitted opening is formed in the dome, and the antenna arrangement has an attachment protruding in a negative z direction, which is received by the fitted opening.

* * * * *